United States Patent [19]
Jones

[11] Patent Number: 5,329,081
[45] Date of Patent: Jul. 12, 1994

[54] MOISTURE SENSOR AND SWITCH

[75] Inventor: Michael J. Jones, Perth, Australia

[73] Assignees: Morningside Holdings Pty. Ltd.; Kingsbrook Investments Pty. Ltd., Western Australia, Australia

[21] Appl. No.: 2,347

[22] Filed: Jan. 15, 1993

[30] Foreign Application Priority Data

Jan. 17, 1992 [AU] Australia .................. PL0444

[51] Int. Cl.⁵ .................. H01H 35/00
[52] U.S. Cl. .................. 200/61.04
[58] Field of Search .................. 200/61.04–61.06

[56] References Cited

U.S. PATENT DOCUMENTS

| 3,562,731 | 2/1971 | Hsu | 340/604 |
| 3,787,650 | 1/1974 | Lewis | 200/61.04 |
| 4,313,042 | 1/1982 | Ehrhart | 200/61.04 |
| 4,696,319 | 9/1987 | Gant | 137/78.3 |

FOREIGN PATENT DOCUMENTS

| 44772/79 | 10/1979 | Australia . |
| 39438/78 | 3/1980 | Australia . |
| 27242/84 | 10/1985 | Australia . |
| 32237/84 | 2/1986 | Australia . |
| 2344772 | 10/1977 | France . |
| 2345894 | 10/1977 | France . |
| 86/06931 | 12/1986 | PCT Int'l Appl. . |
| 89/11787 | 12/1989 | PCT Int'l Appl. . |

Primary Examiner—J. R. Scott
Attorney, Agent, or Firm—Amster, Rothstein & Ebenstein

[57] ABSTRACT

Soil moisture sensor apparatus includes a housing 10 having an expansion chamber 13 and a piston 20 slidably mounted within the housing 10. Formed through the wall of the housing are electrical lead take-outs 15 through which pass cable tails 16. The piston 20 has a rebate 21 adapted to allow the piston 20 to pass partly by a protruding portion of a fixed contact 22 embedded in the wall of the housing at the upper take-out 15. Bearing on the lower surface of the piston 20 is a moving contact 24, the contact 24 being urged against the piston face by a spring 25 which also serves to bias the piston 20 towards the open end of the housing 10. Disposed across the expansion chamber 13 is a flexible membrane 26 retained in position by an end cap assembly including an annular end cap body member 27, an outer mesh screen portion 32 and a dirt excluding inner fabric portion 33. Contained in the space defined between the fabric portion 33 and the flexible membrane 26 is a water swellable polyacrylamide gel bead composition 34, the expansion and contraction of which moves the piston respectively against and with the bias of the spring to break and make the circuit.

11 Claims, 1 Drawing Sheet

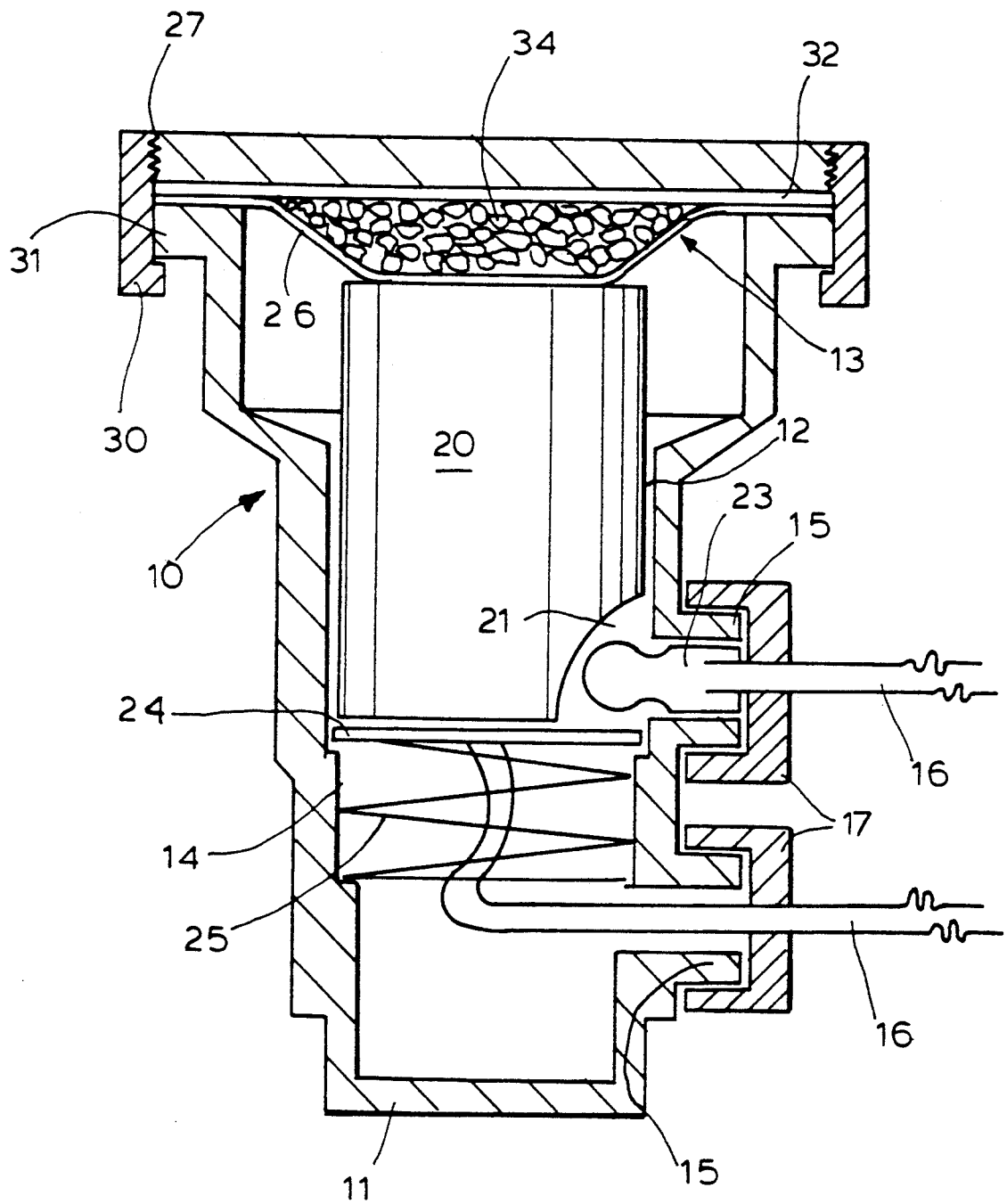

MOISTURE SENSOR AND SWITCH

TECHNICAL FIELD

This invention relates to a moisture sensor for use in controlling irrigation apparatus. This invention relates particularly to moisture sensors capable of controlling electromechanical devices for switching water flow in an irrigation system, although it is envisaged that this invention may find use in other reticulated water supplies.

BACKGROUND OF THE INVENTION

Control of irrigation water flow to plants in agriculture and horticulture is essential to minimize wastage of the resource and salination, as well as to ensure that plants receive sufficient water for productive growth. Overwatering may also be disadvantageous to water sensitive plants. In general, irrigation systems currently in use rely on direct monitoring by observation to determine watering times. Where automation is essential this has generally been achieved by the use of timers.

Watering by observation has the disadvantage that soil moisture conditions below the visible soil surface may not be readily apparent, which may lead to over or under watering. Timers also are acting without regard for the status of the soil at the time of watering. Whilst the watering regime may be modified in each case by having regard to rainfall, and in the case of timer apparatus it has been proposed to interface the output of a rain sensor to modify the timed irrigation regime, the result remains independent of soil condition.

It has been proposed to utilize sensors to monitor soil moisture conditions, such sensors generally being of the conductivity type working on the basis of an electrical current monitoring the amount of moisture in the soil. However, these have proved to be less than reliable in service and additionally must be calibrated for each soil type to give a signal indicative of a selected moisture status. Derivative technology includes ceramic block and ceramic probe sensors, which substantially overcome the reliability problems associated with conductivity type sensors. However, the sensors are extremely expensive and still suffer from calibration problems where different soil types exist.

SUMMARY OF THE INVENTION

The present invention substantially alleviates the above disadvantages and provides soil moisture sensing apparatus which is economical to produce and is reliable and efficient in use. It is an object of the present invention to provide a soil moisture sensing apparatus which will serve to sense soil moisture conditions substantially independently of soil type.

In one aspect the present invention resides in a soil moisture sensor apparatus including:

a housing having a bore therein and open at one end;

a water impervious flexible membrane closing said bore;

a water permeable end cap closing said bore and defining a chamber between said membrane and said end cap;

a water swellable composition filling said chamber;

a piston member slidably located within said bore and biased towards said membrane, and a pair of electrical contacts operable by said piston.

The housing preferably takes the form of a tubular body of any suitable material. Preferably, the tubular body is moulded of reinforced or unreinforced plastics material to provide water resistance and electrical insulation as described hereinafter. The tubular body is preferably moulded having an integrally moulded closed end and integrally formed take-out points for electrical leads to the contact.

Preferably, the housing in the region of the membrane and end cap is moulded or counterbored to an enlarged cross section relative to the portion of the bore slidably mounting the piston. This provides for an increased volume of water swellable material to be enclosed in the chamber defined between the membrane and the end cap.

The water impervious flexible membrane may be of any suitable material including plastic or rubber film materials. It is also envisaged that the membrane may be provided in the form of a plastic or metal bellows or the like. The membrane may be mounted to the bore by any suitable means such as by provision of integrally moulded annular bearing surfaces in the bore adapted to trap the membrane by cooperation with a locating ring or the like. However it is preferred that the end cap be utilized to retain the membrane in its configuration closing the bore in order to reduce the number of parts and complexity of the apparatus and hence reduce the cost.

A semi-flexible impervious membrane may be used so as to limit the amount of movement available in the system between the fully dehydrated state to the fully expanded state to a predetermined degree, thereby achieving greater sensitivity between ON and OFF positions. A fully flexible membrane may be used under different conditions, where less sensitivity may be required.

The water permeable end cap may also take any suitable form as would be indicated to a person skilled in the art. Preferably, the end cap comprises a cap assembly including a cap body member adapted to engage the open end of the housing and be retained thereto by adhesive or by means of mechanical engagement. The cap body member may be perforated to provide the requisite permeability. However, it is preferred the permeability be provided by the use of an annular end cap body having a permeable insert provided in the hole therein.

In the case of apparatus using particulate or granular water swellable compositions, the permeable insert may comprise a woven material such a fiberglass or metal mesh supported in the end cap body. Preferably, the ingress of soil and egress of small particles of water swellable composition is prevented by the use of a permeable fabric backing to the mesh material, the mesh material thereby providing support for the fabric. In order to reduce the complexity of the apparatus, the permeable insert is adapted to be trapped, along with the edge of the impermeable membrane, between the housing and the end cap body in assembly of the apparatus.

The water swellable composition is preferably selected from the classes of water swellable polymers. Preferably the water swellable composition comprises a polyacrylamide gel selected from the group of water swellable polyacrylamides which are cross-linked to form an insoluble network polymer. The polyacrylamide gel polymer materials are preferably utilized in granular or bead form in order to provide substantially linear expansion rates.

The piston may take any suitable form consistent with being slidably mounted in the bore of the housing and being movable against said bias by the expansion of the water swellable composition. Preferably, the piston comprises a moulded plastics piston for ease of production and for the insulative properties of the material. The piston may be biassed towards the membrane by any suitable means such as by spring pressure or alternatively the piston may be sealed to the bore and biassed towards the membrane by gas pressure maintained between the piston and the closed end of the housing.

The pair of electrical contacts may take any suitable form consistent with the function of being operable in response to movement of the piston under the influence of the water swellable composition and/or the bias on the piston. For example, the pair of contacts may comprise fixed contacts relative to the housing and adapted to be opened or closed by breaking or shorting means respectively, associated with the piston. Alternatively, the contacts may be both moving contacts associated with the piston and led out through the housing by means of cable tails.

However, it is preferred that the contacts comprise one fixed contact associated with the housing and a moving contact operable by the piston to engage the fixed contact at a selected level of shrinkage of the drying water swellable composition and to break the contact at a selected point in the swelling of the composition. Preferably the moving contact comprises a plate or annular conductive member maintained in engagement with the piston. Preferably, the engagement with the piston is by means of spring means wherein the spring also serves to bias the piston towards the membrane. The fixed contact may take any suitable form, with it being preferred to use a bullet type fixed contact protruding into the bore from a position embedded in the wall of the housing.

Preferably, the separation of the contacts is provided by means of the piston having a rebate provided in its lower surface and side in the region of the fixed contact such that the base of the piston may bear the moving contact directly, although it is envisaged that the piston may be provided with an integrally formed or separate stand-off portion for the moving contact, at a penalty of greater complexity. The moving contact is preferably not fixed to the piston such that the piston can move beyond the point of contact in closing the contacts, such that positive contact is maintained by spring pressure and such that the contact may be self cleaning by virtue of a slight wiping action between the contacts.

The contacts are provided with leads for connection to for example electromechanical operating means such as solenoids or the like for switching a water supply, and such operating means may also be operable in response to other inputs such as relative humidity, rainfall or the like, or in response to agricultural or horticultural requirements for less or more water at fruiting or flowering. The leads are preferably led out of the housing through watertight exits such that the piston bore and contact region is kept dry. The electrical contacts and especially the fixed contact may be adjustable in position to provide a pre-determined time that the apparatus remain in the closed circuit condition.

In order that this invention be more easily understood, reference will now be made to the accompanying drawing which illustrates the preferred embodiment of the invention.

BRIEF DESCRIPTION OF THE DRAWINGS

FIG. 1 is a side view in cross-section of sensor apparatus, in accordance with the present invention.

DETAILED DESCRIPTION OF THE DRAWINGS

In the figure there is provided a housing 10 having a closed end 11 and defining an open ended bore 12. The outer end of the bore 12 is expanded to form an expansion chamber 13, and the inner end of the bore is of reduced diameter to form a spring housing portion 14. Formed through the wall of the housing are electrical lead take-outs 15 through which pass cable tails 16, the take-outs 15 being made watertight by means of sealing caps 17.

Slidably mounted within the bore 12 is a plastic piston 20 having a rebate 21 adapted to allow the piston 20 to pass partly by a protruding portion of a fixed contact 23 embedded in the wall of the housing at the upper take-out 15 and being electrically connected to a cable tail 16. Bearing on the lower surface of the piston 20 is a circular metal plate moving contact 24, the contact 24 being urged against the piston face by a spring 25 which also serves to bias the piston 20 towards the open end of the housing 10. The contact 24 is electrically connected to its respective cable tail 16.

Disposed across the open side of the expansion chamber 13 is a flexible membrane 26 being deformable to contact the piston 20. The flexible membrane 26 is retained in position across the chamber 13 by an end cap assembly comprising an annular end cap body member 27 of plastics material having an engagement portion 30 adapted to snap onto an annular flange 31 provided about the end of the housing 10. The end cap body member also retains in position, by mutual entrapment with the flexible membrane 26, and outer mesh screen portion 32 and a dirt excluding inner fabric portion 33 of the cap assembly.

Contained in the space defined between the fabric portion 33 and the flexible membrane 26 is a water swellable polyacrylamide gel bead composition 34.

In use, moisture from surrounding soil enters the apparatus through the porous fabric 33 and is absorbed by the water swellable gel 34. As the gel expands with moisture absorption it expands the flexible impervious membrane 26. This in turn exerts pressure on the piston 20, pushing moving electrical contact 24 away from the fixed electrical contact 23, thus breaking the circuit between the cable tails 16 connected across a solenoid or the like and its control or power supply.

As the surrounding soil loses moisture, the reverse of the above procedure occurs, allowing the spring 25, urging the piston 20 against the shrinking gel 34, to move the contact 24 towards the fixed contact 23. Once the moving contact 24 contacts the fixed contact 23, the circuit is connected. However the delay in water reaching the gel 34 and disconnecting the circuit allows the gel 34 to continue to shrink. The piston 20 moves past the point of contact such that the moving contact 24 is tilted between the piston 20 and the fixed contact 23, resulting in the contacts wiping each other and providing for enhanced reliability in service.

Apparatus in accordance with the above embodiment is useful as a moisture activated switch, located in the soil, interrupting the wiring (hence the electrical current) between for example the main control switch of an irrigation system, be it manual, automatic or semiautomatic. The irrigation system may be mains supply, pump or bore fed and control may be exercised by means of a low voltage relay or directly to the solenoid valve or valves. It can be used singularly to operate numerous solenoid valves, by interrupting the common or neutral link to all solenoid valves, or can be used in multiples by interrupting the active to each solenoid valve, i.e. one sensor to each solenoid valve, each then acting independently of the others. The apparatus can also be used with or without a time controller by interrupting the wiring, hence the electrical current, between for example a 12-volt or 24-volt power supply and one or more solenoid valves.

It will of course be realised that while the above has been given by way of illustrative example of this invention, all such and other modifications and variations thereto, as would be apparent to person skilled in the art, are deemed to fall within the broad scope and ambit of this invention as defined in the claims appended hereto.

I claim:
1. Soil moisture sensor apparatus including:
   a housing having an axial bore therein and open at one end;
   a water impervious flexible membrane closing said bore;
   a water permeable end cap secured to said bore about said open end and defining a chamber between said membrane and said end cap;
   a water swellable composition filling said chamber;
   a piston axially slidably located within said bore and biased axially towards said membrane, and
   a pair of electrical contacts, one of said contacts being fixed to said housing and the other of said contacts being movable by said piston between electrical contact and non-contact positions with the one contact, said moving contact not being fixed to said piston and passage of said piston beyond the point of engagement with said moving contact causing said fixed contact to tilt the moving contact to provide a wiping action between the contacts.

2. Soil moisture sensor apparatus according to claim 1, wherein said housing comprises a tubular body moulded of plastics material and having an integrally moulded closed end.

3. Soil moisture sensor apparatus according to claim 2, wherein said housing is moulded or counterbored to an enlarged cross section relative to the portion of the bore slidably mounting the piston.

4. Soil moisture sensor apparatus according to claim 1, wherein said water impervious flexible membrane is retained by said end cap in its configuration closing the bore.

5. Soil moisture sensor apparatus according to claim 1, wherein said end cap comprises a cap assembly including an annular cap body member releasably engaging said open end of the housing and having a permeable insert comprising an outer mesh portion and an inner permeable fabric portion.

6. Soil moisture sensor apparatus according to claim 5, wherein said permeable insert is retained by entrapment between said annular cap body member and the end of said housing.

7. Soil moisture sensor apparatus according to claim 1, wherein said water swellable composition is a polyacrylamide gel selected from the group of water swellable crosslinked polyacrylamides.

8. Soil moisture sensor apparatus according to claim 1, wherein said piston comprises a molded plastics piston and additionally including means biasing said piston towards the membrane.

9. Soil moisture sensor apparatus according to claim 1, wherein said pair of electrical contacts comprise a fixed contact associated with the housing and a movable contact operable by the piston to engage the fixed contact at a selected level of shrinkage of the drying water swellable composition and to break the contact at a selected point in the swelling of the composition.

10. Soil moisture sensor apparatus according to claim 9, wherein said moving contact comprises a conductive member maintained in engagement with the piston by said biasing means and said fixed contact protrudes into the bore from a position embedded in the wall of the housing, said piston being rebated to pass said fixed contact.

11. Soil moisture sensor apparatus according to claim 1 which is responsive to both low and high soil moisture levels and includes means for axially biasing said piston towards said membrane.

* * * * *